US012714013B2

(12) United States Patent
Schiffer et al.

(10) Patent No.: US 12,714,013 B2
(45) Date of Patent: Aug. 25, 2026

(54) ROBOTIC LAWNMOWER SYSTEM

(71) Applicant: HUSQVARNA AB, Huskvarna (SE)

(72) Inventors: Eric Schiffer, Neu-Ulm (DE); Sandro Strazzeri, Leipheim (DE); Michael Schwarzkopf, Neu-Ulm (DE); Frederik Andriof, Illerkirchberg (DE); Yunus-Murat Baykara, Esslingen (DE)

(73) Assignee: HUSQVARNA AB, Huskvarna (SE)

( * ) Notice: Subject to any disclaimer, the term of this patent is extended or adjusted under 35 U.S.C. 154(b) by 556 days.

(21) Appl. No.: 18/143,821

(22) Filed: May 5, 2023

(65) Prior Publication Data

US 2023/0354739 A1 Nov. 9, 2023

(30) Foreign Application Priority Data

May 6, 2022 (SE) .................................... 2250549-9

(51) Int. Cl.
*A01D 34/00* (2006.01)
*B60K 1/02* (2006.01)
(Continued)

(52) U.S. Cl.
CPC .............. *A01D 34/008* (2013.01); *B60K 1/02* (2013.01); *A01D 34/78* (2013.01);
(Continued)

(58) Field of Classification Search
CPC .......................... A01D 34/008; A01D 2101/00
See application file for complete search history.

(56) References Cited

U.S. PATENT DOCUMENTS 10,462,961 B2 * 11/2019 Tjernberg ............... G01S 19/49
10,691,000 B2 * 6/2020 Du ........................ G03B 17/55
(Continued)

FOREIGN PATENT DOCUMENTS

CN 102523841 A 7/2012
CN 208016344 U 10/2018
(Continued)

OTHER PUBLICATIONS

Swedish Office Action and Search Report for Swedish Application No. 2250549-9, Mailed on Nov. 25, 2022.

*Primary Examiner* — Brian L Swenson
(74) *Attorney, Agent, or Firm* — Burr & Forman

(57) ABSTRACT

A robotic lawnmower (14) comprises a chassis (18), and an outer shell (20) defining an exterior face of the robotic lawnmower (14), the outer shell (20) comprising a skirt enclosing the chassis (18) at a distance therefrom. A sensor module (30; 34) comprises a chassis connection interface for mechanically connecting the sensor module (30; 34) to a module connection interface on the chassis (18). The sensor module (30; 34) holds the sensor outside a vertical projection of the chassis (18), between the chassis (18) and the skirt. The module connection interface is located on a top face of the chassis (18), and the sensor module housing extends downwards to a position vertically lower than the module connection interface. A cantilever member holds a main housing body of the sensor module (30; 34) with a horizontal gap between the main housing body and the chassis (18).

20 Claims, 10 Drawing Sheets

(51) Int. Cl.

| | |
|---|---|
| *A01D 34/78* | (2006.01) |
| *A01D 101/00* | (2006.01) |
| *B60L 50/60* | (2019.01) |
| *G05D 1/00* | (2006.01) |

(52) U.S. Cl.

CPC ........... *A01D 2101/00* (2013.01); *B60L 50/60* (2019.02); *B60L 2200/40* (2013.01); *G05D 1/0257* (2013.01)

(56) References Cited

U.S. PATENT DOCUMENTS

| | | | | |
|---|---|---|---|---|
| 11,129,327 | B2 * | 9/2021 | Hong | G01D 5/145 |
| 11,140,820 | B2 * | 10/2021 | Hong | A01D 34/64 |
| 2015/0198952 | A1 * | 7/2015 | Einecke | B08B 1/143 15/300.1 |
| 2015/0366129 | A1 | 12/2015 | Borinato | |
| 2018/0184583 | A1 | 7/2018 | Morin et al. | |
| 2018/0199506 | A1 * | 7/2018 | Ito | A01D 34/008 |
| 2020/0050208 | A1 | 2/2020 | Frick et al. | |
| 2020/0137952 | A1 * | 5/2020 | Liljedahl | B60L 53/36 |
| 2021/0116911 | A1 | 4/2021 | Pjevach | |
| 2021/0235616 | A1 | 8/2021 | Stark et al. | |
| 2021/0298556 | A1 | 9/2021 | Huang et al. | |
| 2022/0066456 | A1 | 3/2022 | Ebrahimi et al. | |

FOREIGN PATENT DOCUMENTS

| | | | |
|---|---|---|---|
| CN | 113099820 | A | 7/2021 |
| EP | 2894532 | A1 | 7/2015 |
| EP | 2939508 | A1 | 11/2015 |
| EP | 3549428 | A1 | 10/2019 |
| EP | 3669731 | A1 | 6/2020 |
| EP | 3778144 | A1 | 2/2021 |
| EP | 3794922 | A1 | 3/2021 |
| FR | 3106250 | A3 | 7/2021 |
| GB | 2295304 | A | 5/1996 |
| WO | 2019238273 | A1 | 12/2019 |
| WO | 2021098868 | A1 | 5/2021 |

* cited by examiner 16
10
14
13
12

14
18
20
14b
22b
F
22a
14a
94
20a

A
22a
18
24
56
34
30
54
56
56
56
F
56
54
52a
52b
24
22b
A 22b
18b
62b
60b
63
58
62a
60a
22a 14
20
32
34a
70
42
34
88
72
FR
74
76b
90a
18a
76a
78
18b
90
d1
d2
84
50
50a
92
86
90c
82
90b
20a
D
18
20b 20
32
30
94
94
76
P
96
48
18a
18b
20a
18

20
18
STOP
96
94
30
98

STOP
98

ROBOTIC LAWNMOWER SYSTEM

FIELD OF THE INVENTION

The present invention relates to a robotic lawnmower system comprising a robotic lawnmower and a sensor module. The invention further relates to a robotic lawnmower and a sensor module for such a system.

BACKGROUND

Since their introduction on the market, robotic lawnmowers have facilitated lawn maintenance considerably. Typically, different robotic lawnmower models are adapted for different needs, and have different functions. For example, WO 2019/238273 suggests a robotic lawnmower provided with a variety of optionally selectable functional modules, which may be mounted in respective cavities within the chassis. A further consideration in the design of robotic lawnmowers is the robotic lawnmower's ability to handle difficult terrain, such as slopes and obstacles. Hence, it is desirable to increase the degree of versatility and the ability to transit different types of terrain, or to improve the balance between the two requirements.

SUMMARY

It is an object of the present invention to solve, or at least mitigate, parts or all of the above mentioned problems. To this end, according to a first aspect there is provided a robotic lawnmower system comprising: a robotic lawnmower comprising a chassis provided with a set of wheels and at least one propulsion motor for propelling the robotic lawnmower via the set of wheels, the chassis enclosing the propulsion motor and a controller configured to control the operation of the at least one propulsion motor; and an outer shell defining an exterior face of the robotic lawnmower, the outer shell comprising a skirt at least partly enclosing the chassis at a distance from the chassis, wherein the robotic lawnmower system further comprises: a sensor module comprising a sensor and a sensor module housing enclosing the sensor, wherein the sensor module comprises a chassis connection interface for mechanically connecting the sensor module to a module connection interface on an outer face of the chassis, thereby enabling the sensor module to be carried by the robotic lawnmower, wherein, when the sensor module is connected to the chassis, the sensor module holds the sensor outside a vertical projection of the chassis, between the chassis and the skirt. Such a position increases the versatility of the robotic lawnmower system, because a single module connection interface can be used for a sensor module comprising either, or both, of e.g. a downward-detecting sensor and a forward-detecting sensor. Moreover, even though the sensor module is positioned outside the chassis, the sensor module need not substantially add to the vertical height of the chassis, which enables keeping a low profile of the robotic lawnmower, and thereby improves the robotic lawnmower's ability to navigate below bushes and branches. Furthermore, the position of the vital parts of the sensor module, i.e. the sensor itself, enables exposing the main part of the sensor module housing's outer face to a free flow of ambient air, which improves cooling of the sensor module. At the same time, the sensor module will be protected by the skirt against build-up of dirt, which further improves cooling.

According to a second aspect, there is provided a robotic lawnmower system comprising: a robotic lawnmower comprising a chassis provided with a set of wheels and at least one propulsion motor for propelling the robotic lawnmower via the set of wheels, the chassis enclosing the propulsion motor and a controller configured to control the operation of the at least one propulsion motor; and an outer shell defining an exterior face of the robotic lawnmower, the outer shell comprising a skirt at least partly enclosing the chassis at a distance from the chassis, wherein the robotic lawnmower system further comprises: a sensor module comprising a sensor and a sensor module housing enclosing the sensor, wherein the sensor module comprises a chassis connection interface for mechanically connecting the sensor module to a module connection interface on an outer face of the chassis, thereby enabling the sensor module to be carried by the robotic lawnmower, wherein the module connection interface is located on a top face of the chassis, and the sensor module housing extends downwards to a position vertically lower than the module connection interface. Thereby, the module connection interface will be located at a position protected from grass clippings. At the same time, the sensor module need not substantially add to the vertical height of the robotic lawnmower, which improves the robotic lawnmower's ability to navigate below bushes and branches.

According to a third aspect, there is provided a robotic lawnmower system comprising: a robotic lawnmower comprising a chassis provided with a set of wheels and at least one propulsion motor for propelling the robotic lawnmower via the set of wheels, the chassis enclosing the propulsion motor and a controller configured to control the operation of the at least one propulsion motor; and an outer shell defining an exterior face of the robotic lawnmower, the outer shell comprising a skirt at least partly enclosing the chassis at a distance from the chassis, wherein the robotic lawnmower system further comprises: a sensor module comprising a sensor and a sensor module housing enclosing the sensor, wherein the sensor module comprises a chassis connection interface for mechanically connecting the sensor module to a module connection interface on an outer face of the chassis, wherein the sensor module housing comprises a main housing body enclosing the sensor, and a cantilever member comprising the chassis connection interface, wherein, when the sensor module is connected to the chassis, the cantilever member holds the main housing body with a horizontal gap between the main housing body and the chassis. Such an arrangement exposes the main part of the sensor module's outer face, including the chassis-facing side of the main housing body, to air, which improves cooling of the sensor module. According to embodiments, the horizontal gap may be smaller than 50 mm; this facilitates obtaining a compact shape of the robotic lawnmower. Moreover, a compact arrangement may be of particular use e.g. in case the skirt is movable in relation to the chassis, e.g. as part of a collision detection system. Preferably, the gap is greater than 2 mm; thereby, a certain air flow may be ascertained. Preferably, the main housing body is held with a gap also to the skirt; again, this may be particularly useful in conjunction with a movably mounted outer shell skirt. According to embodiments, the sensor module housing may be integrally formed with the cantilever member, and optionally, also with the chassis connection interface. According to embodiments, the cantilever member holds a lower portion of the main housing body freely suspended. According to embodiments, the freely suspended lower portion may represent more than 30% of a vertical height of the sensor module. According to embodiments of any of the robotic lawnmower systems herein, a lower edge of the skirt may be positioned vertically lower than the sensor module. Thereby, a full protection of the sensor module against horizontal impact, e.g. due to collisions, may be obtained. The outer shell may be shaped to cover the entire upper face of the sensor module. The chassis may be configured to water-tightly enclose the controller and the propulsion motor; for example, the chassis may have an ingress protection rating for outdoor use, such as IP54 or better. The chassis may be defined by a lower chassis shell and an upper chassis shell, which are interconnected to define an enclosed space. Similarly, the sensor module housing may water-tightly enclose the sensor with an ingress protection rating such as IP54 or better.

According to embodiments of any of the above aspects, the set of wheels may comprise a pair of drive wheels arranged on opposing lateral sides of the chassis adjacent to a first longitudinal end of the chassis, wherein the module connection interface is arranged at said first longitudinal end of the chassis. Thereby, the added weight of the sensor module will be positioned on a distal side of the wheel axis of the drive wheels, i.e. on the side of the wheel axis which is opposite to the robotic lawnmower's centre of mass. The connection of a sensor module to the chassis thereby results in a beneficial weight distribution, enabling an improved traction of the drive wheels. Any wheels at a second longitudinal end, opposite to the first longitudinal end, may be non-driven. Depending on whether the robotic lawnmower is driven by the front wheels or the rear wheels, said first longitudinal end may be a front end or a rear end. According to embodiments, the sensor module may have a weight of between 200 grams and 400 grams; thereby, an adequate contribution to the traction of the robotic lawnmower may be obtained without unduly compressing the grass.

According to embodiments, the module connection interface may be integrally formed with the chassis. For example, the chassis may be configured as a chassis shell made of plastic, and the module connection interface may be defined by the shape of the chassis shell. The chassis shell may have an exemplary chassis shell wall thickness of between 0.75 mm and 2.5 mm.

According to embodiments, the chassis may, at the position of the module connection interface, be defined by a single continuous, indivisible chassis shell wall free from through-holes and joints. Due to the integral nature of the chassis shell wall, a complete water-tightness of the module connection interface is warranted regardless of whether the sensor module is connected to the robotic lawnmower or not, which reduces the risk of moist entering the chassis. Moreover, due to the lack of any chassis shell wall disruptions defined by electric interfaces of galvanic type at the position of the module connection interface, any moist or dirt trapped in the mechanical interface defined by the mating module and chassis connection interfaces will not disturb the electrical transmission between the sensor module and the controller.

According to embodiments, the module connection interface may be located on a top face of the chassis, and the sensor module may comprise a downward-detecting sensor. Thereby, the downward-detecting sensor will be mechanically held at a position well protected from grass clipping and debris. This will result in high reliability of the downward-detecting sensor. According to embodiments, the sensor may comprise a light detector facing the ground, the light detector being configured to determine a spectral characteristic of the grass.

According to embodiments, the module connection interface of the chassis may comprise a guide configured to receive the chassis connection interface of the sensor module from above. Thereby, gravity will contribute to maintain the sensor module in engagement with the guide. A lower portion of the guide may define a vertical stop position for the chassis connection interface. The guide may comprise a male part such as a guide rail, a female part such as a guide track or guide slot, or both.

According to embodiments, the guide may comprise a guide slot, and the chassis connection interface may comprise a key configured to formfittingly mate with the guide slot. A special case of such a joint is a so-called T-slot joint. According to embodiments, the guide slot has a gradually tapering cross-section configured to gradually engage with lateral sides of the key, to define a vertical stop position of the key. Thereby, a firm engagement between the guide slot and the key, without any possibility of rattling while the robotic lawnmower transits the work area, may be obtained.

According to embodiments, one of the module connection interface and the chassis connection interface may comprise a resilient snap element configured to, when the chassis connection interface is moved along the guide to a connected position, resiliently snap into engagement with the other of the module connection interface and the chassis connection interface. Preferably, the snap element is provided on the chassis connection interface of the sensor module; thereby, the chassis as such can be made as free as possible from external structures which may otherwise be prone to deposits of grass or debris when the sensor module is not connected. According to embodiments, the snap element may be configured to be manually released without the use of tools. By way of example, the snap element may comprise a spring tab, which may optionally extend vertically upwards from the sensor module when connected to the chassis.

According to embodiments, the chassis may comprise an electrical connection interface, for electrically connecting the sensor module to the controller, wherein the electrical connection interface is separated from the module connection interface of the chassis. Such a design renders the electrical connection between the module and the chassis less sensitive to vibration, because any relative movement between the sensor module and the chassis will not disturb the electrical connection between them. This enables the lawnmower system to withstand transiting a quite bumpy work area without suffering from an intermittent electrical connection between the robotic lawnmower and the sensor module. According to embodiments, the sensor module may comprise a flexible cable extending from the sensor module housing, the cable being provided with a connector, and the electrical connection interface may comprise a connector socket configured to receive the connector. According to embodiments, the connector socket may be positioned on a top face of the chassis. According to examples, the electrical connection interface may be separated from the module connection interface of the chassis by a separation distance exceeding 20 mm, or by a separation distance exceeding 40 mm.

According to embodiments, the sensor may comprise a radar. The position of the radar outside the chassis enables freely selecting the material and thickness of the chassis without concerns to the transmissivity of radar waves. This enables making a mechanically stronger chassis.

According to a fourth aspect, there is provided a robotic lawnmower system comprising: a robotic lawnmower comprising a chassis provided with a set of wheels and at least one propulsion motor for propelling the robotic lawnmower via the set of wheels, the chassis enclosing the propulsion motor and a controller configured to control the operation of the at least one propulsion motor; and an outer shell defining an exterior face of the robotic lawnmower, the outer shell at least partly enclosing the chassis at a distance from the chassis, wherein the robotic lawnmower system further comprises: a sensor module comprising a sensor and a sensor module housing enclosing the sensor, wherein the sensor module comprises a chassis connection interface for mechanically connecting the sensor module to a module connection interface on an outer face of the chassis, inside the outer shell, thereby enabling the sensor module to be carried by the robotic lawnmower, wherein the sensor is configured to transmit and/or receive electromagnetic radiation along a transmission path, the sensor module housing comprises an air outlet and a first air inlet, and the sensor module comprises a fan configured to move air along an air guide from said first air inlet to the air outlet, wherein one of the air outlet and said first air inlet defines a sensing aperture positioned along the transmission path. The sensor module's position inside the outer shell reduces the risk of drawing moist into the sensor module, such that the transmission path of the electromagnetic radiation may be kept clear. At the same time, by arranging the sensor in a module external to the chassis, no air flow through the chassis is needed. Thereby, no moist or dirt is drawn into the chassis by the fan, which reduces the risk of malfunction of electronics therein. Preferably, said air outlet defines the sensing aperture. According to embodiments, the chassis may comprise a battery for operating the propulsion motor, and the fan of the sensor module may be powered by the battery of the chassis. The robotic lawnmower system maybe configured in accordance with any of the other aspects and embodiments defined hereinabove. For example, arranging the sensor module outside the vertical projection of the chassis, or with a horizontal gap to the chassis, enables a great freedom in the positioning of the air outlet and said first inlet; for example, air may be drawn from the top of the sensor module and expelled at the bottom of the sensor module. Furthermore, by positioning the sensor module externally on a side of the chassis, so as to protrude therefrom, the sensor module's position in a free air volume operates synergistically with the internal air flow generated by the fan to cause an efficient cooling of the sensor module.

According to embodiments, the sensor module housing may comprise a liquid-tight electronics compartment, wherein the sensor is arranged in the electronics compartment, and the electronics compartment comprises a transparent window between the sensor and the air guide. For example, the electronics compartment may have an ingress protection rating for outdoor use, such as IP54 or better. According to embodiments, the sensor module may also comprise a sensor controller arranged within the electronics housing. The sensor and the sensor controller may be co-located on a printed circuit board.

According to embodiments, said first air inlet may be positioned on a substantially vertical wall of the sensor module housing. Such an arrangement reduces the risk of debris accumulating at said first air inlet. Here, a substantially vertical wall should be construed as a wall forming an angle of less than 20 degrees with a vertical axis when the sensor module is connected to the chassis, and the robotic lawnmower is positioned on a horizontal surface.

According to embodiments, said first air inlet may be positioned vertically higher than the air outlet when the sensor module is connected to the chassis. Such an arrangement moves air from a drier and cleaner environment towards a moister and less clean environment, which increases the reliability of the sensor. According to embodiments, the air outlet may be positioned at a lowermost portion of the sensor module housing. Alternatively or additionally, the first air inlet may be positioned at an upper end of the sensor module housing.

According to embodiments, said first air inlet may be configured as an elongate slot having a width of less than 4 mm, and a length of more than 20 mm. The elongate slot may be intermittent, i.e. interrupted by bridges spanning the slot, or continuous. Hence, for the purpose of the present disclosure, a line of closely spaced apertures is to be regarded as an elongate slot. According to embodiments, the direction of elongation of the slot may extend in a vertical direction when the sensor module is connected to the chassis. Such an orientation reduces the risk of clogging with debris.

According to embodiments, the module housing may comprise a first housing shell attached to a second housing shell, wherein said first air inlet is defined by an elongate gap extending along an interface between the first and second housing shells.

According to embodiments, said first air inlet may be provided in a portion of the sensor module housing which, when the sensor module is connected to the chassis, faces the chassis. Such a geometry reduces exposure of the first air inlet to debris.

According to embodiments, the sensor module housing may comprise a second air inlet. Such an arrangement reduces the sensitivity to clogging of said first air inlet. The second air inlet may be configured in accordance with any of the embodiments of the first air inlet as defined hereinabove.

According to embodiments, the first and second air inlets face in different directions. Such an arrangement reduces sensitivity to clogging of said first and second air inlets. According to embodiments, the first and second air inlets may face in opposite directions. The sensor module housing may also comprise a third air inlet facing in a direction different from the first and second air inlets.

According to embodiments, a detection face of the sensor may face in a detection direction along a detection axis, and the air guide may comprise an upstream guide segment positioned, with regard to the detection axis, at an axial position behind the detection face, a downstream guide segment positioned, with regard to the detection axis, at an axial position in front of the detection face. Optionally, the air guide may further comprise a flow deflector configured to deflect a flow of air from the upstream guide segment towards a space in front of the sensor, in a deflection direction forming an angle of more than 45 degrees with the detection axis. Thereby, the airflow will curve around the detection face, and brushes along the detection face of the sensor or any transparent window in front of it, as the case may be, to keep it clean and free from fog. According to further embodiments, the flow deflector is configured to deflect the flow of air in a deflection direction forming an angle of more than 60 degrees, or of more than 75 degrees, with the detection axis. The detection axis is defined by the surface normal of the detection face of the sensor. According to embodiments, the upstream guide section may pass the sensor on only one lateral side of the sensor. Such an arrangement may result in increased effectiveness of the deflected airflow in the space in front of the sensor to keep the detection face/transparent window free from dirt.

Optionally, and independently of any flow deflector, the upstream guide section may pass the sensor on the side of the sensor facing away from the chassis. Thereby, the sensor as such may be positioned as close to the chassis as possible.

This may increase the sensor's field of view, since it will be less obstructed by the presence of an outer shell, which may typically have a skirt extending downwards to a vertical position lower than the chassis.

According to embodiments, the air outlet has an outlet area of less than 90% of a cross-section of the air guide upstream of the air outlet. Such an arrangement facilitates maintaining an overpressure in the air guide, resulting in a lowered risk of debris entering the air guide in a direction opposite to the flow direction, while enabling a low power consumption of the fan. According to further embodiments, the air outlet has an outlet area of less than 70% of a cross-section of the air guide upstream of the air outlet.

According to embodiments, a rotation axis of the fan is transversal to the detection axis. This permits a compact arrangement of the fan. A smallest angle between the rotation axis of the fan may, according to further embodiments, exceed 45 degrees; for example, it may be a substantially right angle. The fan may be an axial fan. Alternatively or additionally, the fan may be a radial fan; such a fan may also enable a particularly compact arrangement of the fan within the limited space available in a sensor module. The fan may be configured to generate an air flow which is transversal to the detection axis, in a flow direction towards an upstream guide segment of the air guide, which upstream guide segment may extend on a single lateral side of the sensor.

According to embodiments, the transmission path may form an angle of less than 20 degrees with a vertical axis when the robotic lawnmower is positioned on a horizontal surface.

The sensor may, for example, comprise a detector configured to detect light in the infrared and/or red wavelength range. Such a sensor may be particularly well suited to detect the character of the grass below the robotic lawnmower system.

According to embodiments, the sensor may be positioned more than 6 mm from the sensing aperture. Thereby, a good shielding of the sensor against stray light may be obtained. According to further embodiments, the sensor may be positioned more than 10 mm from the sensing aperture. Preferably, the distance between the sensor and the sensing aperture is less than 50 mm.

According to embodiments, the sensor may be a lawn quality sensor configured to detect the presence and/or health of grass. As such, the sensor may be configured to detect electromagnetic radiation intensities at two different wavelength ranges, and determine a ratio based on the two intensities. Typically, the two wavelength ranges may comprise a near-infrared wavelength range and a red wavelength range in the visible wavelength region. Such a sensor is generally referred to as NDVI, Normalized Difference Vegetation Index, sensor. Optionally, the sensor may comprise one or more electromagnetic radiation sources adapted to emit electromagnetic radiation at the two wavelength ranges. The electromagnetic radiation source(s) may be pulsed or modulated to enable frequency discrimination.

According to a fifth aspect, there is provided a sensor module for use as said sensor module in the robotic lawnmower system as defined according to any of the preceding aspects.

According to a sixth aspect, there is provided a robotic lawnmower comprising: a chassis provided with a set of wheels and at least one propulsion motor for propelling the robotic lawnmower via the set of wheels, the chassis enclosing the propulsion motor and a controller configured to control the operation of the at least one propulsion motor; and an outer shell defining an exterior face of the robotic lawnmower, the outer shell comprising a skirt at least partly enclosing the chassis at a distance from the chassis, and a radar module positioned between the chassis and the skirt, wherein the skirt comprises a skirt aperture in register with the radar module. Such an arrangement protects the radar module against dirt, while at the same time enabling a free flow of air to cool of the module, which enables operating the module at a higher power. Thereby, more efficient sensing may be obtained. According to embodiments, the robotic lawnmower may be provided with a chargeable battery and a charging interface configured to charge the battery from a charging station external to the robotic lawnmower, wherein the charging interface is not in register with said skirt aperture. Locating the charging interface at a position separate from said skirt aperture enables free flow of air in front of the sensor module also when the lawnmower is docked to the charging station. The radar module may be configured as an attachable/detachable sensor module in a robotic lawnmower system, for example in accordance with any of the aspects and embodiments defined hereinabove, and may also comprise other sensors and functions. Such a robotic lawnmower system may further comprise a removable lid covering the skirt aperture. The removable lid may be used for covering the skirt aperture whenever the radar module is not attached to the chassis.

According to embodiments, the skirt aperture may be covered by a tamper protection. Such an arrangement increases the safety of the robotic lawnmower, and renders tampering with the radar module and any moving parts below the outer shell more difficult. Also, the tamper protection may prevent the skirt aperture from being mistaken for a lifting handle. The tamper protection may be configured as a removable lid or a grille. A grille may be made transparent to radar waves, while enabling efficient tamper protection. It may be preferred that the tamper protection be free from any through-apertures large enough to permit a finger to be inserted therethrough.

According to embodiments, the radar module may comprise a radar module housing separate from the chassis. Thereby, the chassis may be made of a material and thickness optimizing the chassis' structural integrity and tightness against moist, while the radar module housing may be made of a material and thickness optimized for radar transmissivity. Hence, an efficient radar detection may be obtained without compromising other aspects of the robotic lawnmower.

It is noted that embodiments of the invention may be embodied by all possible combinations of features recited in the claims. Further, it will be appreciated that the various embodiments described for the different aspects are all combinable with each other.

BRIEF DESCRIPTION OF THE DRAWINGS

The above, as well as additional objects, features and advantages of the present invention, will be better understood through the following illustrative and non-limiting detailed description of preferred embodiments of the present invention, with reference to the appended drawings, where the same reference numerals will be used for similar elements, wherein.

All the figures are schematic, not necessarily to scale, and generally only show parts which are necessary in order to elucidate the embodiments, wherein other parts may be omitted.

DETAILED DESCRIPTION OF THE EXEMPLARY EMBODIMENTS

Figures 1, 2:
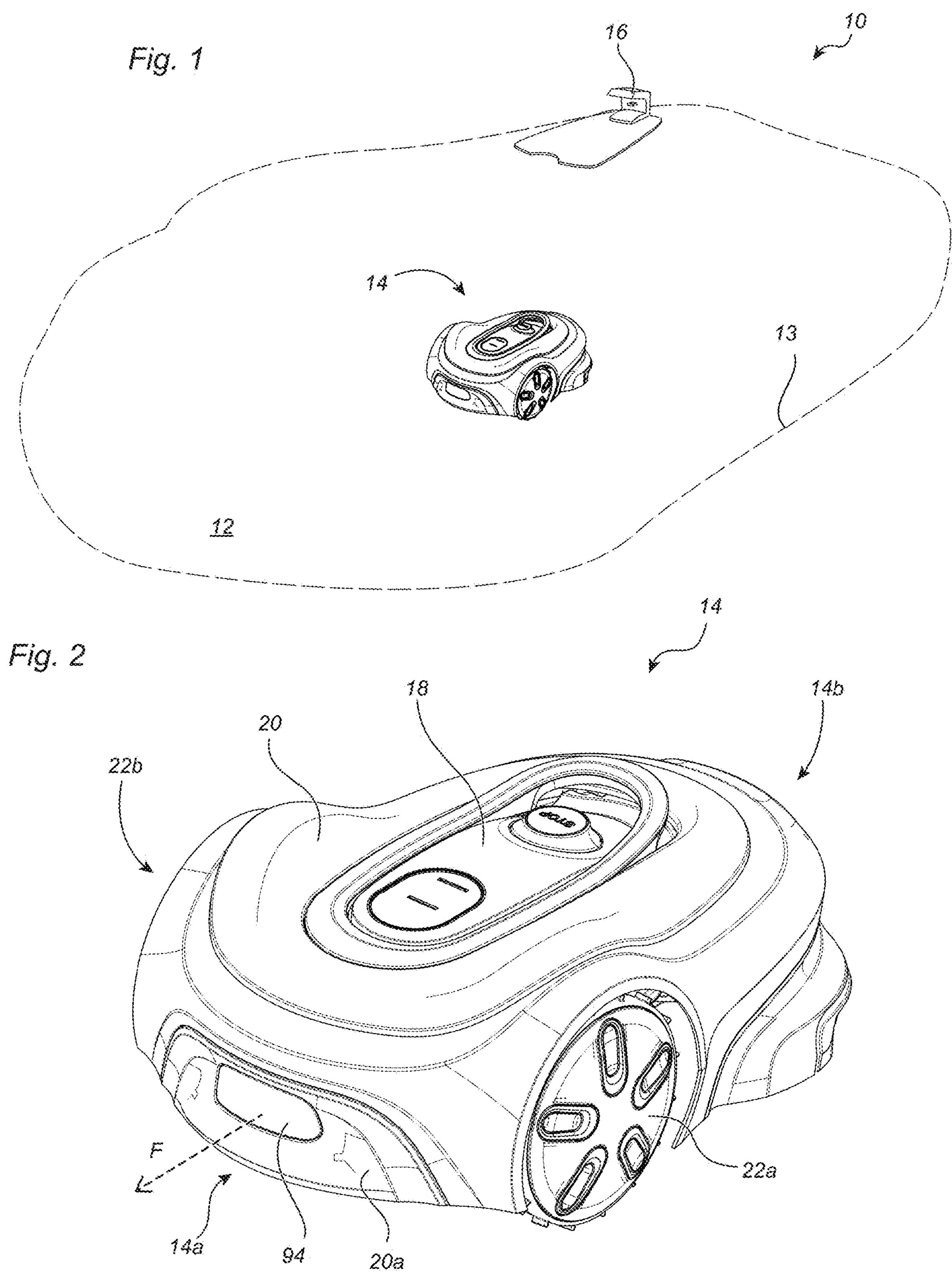
FIG. 1 is a view in perspective of a robotic lawnmower system comprising a robotic lawnmower.
FIG. 2 is a perspective view of the robotic lawnmower of FIG. 1.

FIG. 1 schematically illustrates an overview of a robotic lawnmower system 10 configured to mow a lawn within a work area 12 such as a garden, a park, a football field or a golf court, the work area 12 being defined by a work area boundary 13. The robotic lawnmower system 10 comprises a self-propelled robotic lawnmower 14, which is configured to autonomously navigate the work area 12 to cut grass, and a battery charging station 16. The work area boundary 13 may be defined by e.g. a boundary cable, or may be configured as a virtual perimeter, i.e. a geofence.

FIG. 2 illustrates the robotic lawnmower 14 in greater detail. The robotic lawnmower 14 comprises a chassis 18, and an outer shell 20 which partly covers the chassis and defines an exterior face of the robotic lawnmower 14. A lower portion of the outer shell 20 defines skirt 20*a* which encloses the chassis. The robotic lawnmower 14 extends in a longitudinal direction between a front end 14*a* of the lawnmower 14 and a rear end 14*b* of the lawnmower 14, and during normal operation, the robotic lawnmower 14 mainly propels itself in a forward propulsion direction F along the longitudinal direction. For the purpose, the chassis 18 is, adjacent to the front end 14*a*, provided with a pair of drive wheels 22*a*, 22*b*, one of which is visible in the view of FIG. 1. The drive wheels 22*a*, 22*b* are arranged on opposing lateral sides of the chassis 18.

Figure 3:
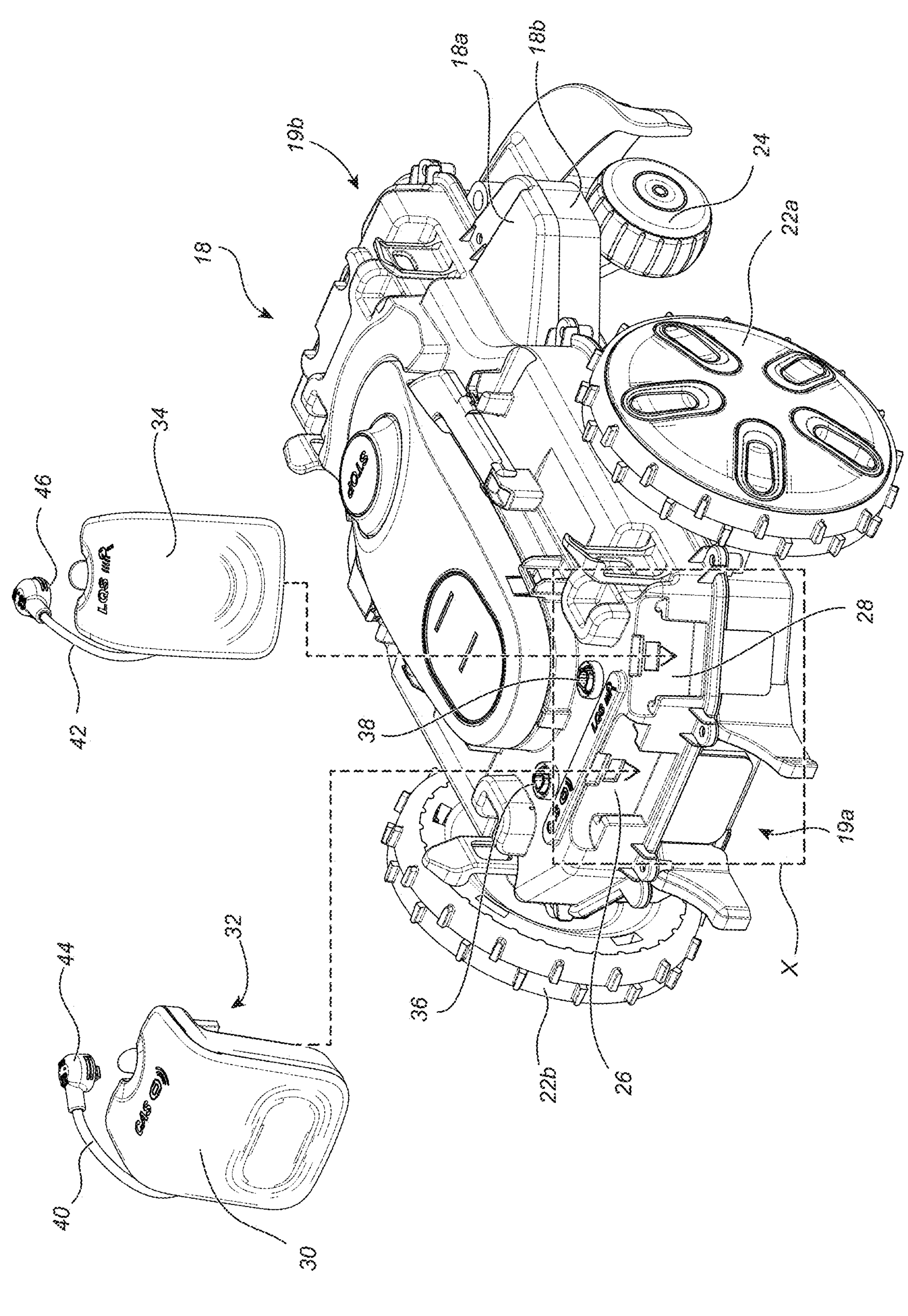
FIG. 3 is a perspective view of a chassis of the robotic lawnmower of FIG. 2, along with a radar module and a lawn quality sensor module prior to connection to the chassis.

FIG. 3 illustrates the robotic lawnmower 14 without the outer shell 20 (FIG. 1), to fully expose the chassis 18. In addition to the drive wheels 22*a*, 22*b* at the front, the chassis is also provided with a pair of rear wheels 24, one of which is visible in the view of FIG. 3. The rear wheels 24 are of caster type, and are not driven to propel the lawnmower 14. Thereby, the robotic lawnmower 14 (FIG. 2) is of front-wheel drive type.

The chassis 18 is defined by an upper chassis shell 18*a* and a lower chassis shell 18*b*, which are attached to each other to water-tightly enclose an interior space of the chassis 18. The interior space houses, inter alia, electronics for operating the lawnmower, for example a controller, and will be described further below. A longitudinal end of the chassis 18, and more precisely, the front end 19*a* of the chassis 18 is provided with a first module connection interface 26 and a second module connection interface 28, which will be described in greater detail further below. The first module connection interface 26 is positioned at the lateral centre of the front end 19*a* of the chassis 18, whereas the second module connection interface 28 is positioned laterally offset from the lateral centre of the chassis 18. The first module connection interface 26 is configured to be mechanically connected to a first sensor module 30, which in the illustrated example comprises a radar. The first sensor module 30 comprises a chassis connection interface 32 configured to mate with the first module connection interface 26 of the chassis 18, thereby enabling the first sensor module 30 to be carried by the robotic lawnmower 14 (FIG. 1) at the lateral centre of the front end 19*a* of the chassis 18. Similarly, the second module connection interface 28 is configured to be mechanically connected to a second sensor module 34, which in the illustrated example comprises a lawn quality sensor. The second sensor module 34 comprises a chassis connection interface (not visible in the view of FIG. 3) configured to mate with the second module connection interface 26 of the chassis 18, thereby enabling also the second sensor module 34 to be carried by the robotic lawnmower 14 (FIG. 1). The robotic lawnmower 14 (FIG. 1) is a fully functional, autonomously operating robotic lawnmower without the sensor modules 30, 34, but each of the first and second sensor modules 30, 34 adds a respective optional capability to the robotic lawnmower 14. In the present case, the first sensor module 30 comprises a forward-detecting sensor which adds the capability of remote mapping of the vicinity of the robotic lawnmower 14, in front thereof, and the second sensor module 34 is a downward-detecting sensor which adds the capability of detecting the presence and health of any grass below the robotic lawnmower 14. Each of the optional sensor modules 30, 34 is independent of the other sensor module 34, 30, and may be independently added to the chassis 18 alone or in combination with the other sensor module. Both module connection interfaces 26, 28 are positioned on the top face of the chassis 18, and are configured to receive the chassis interfaces 32 of the respective sensor modules 30, 34 from above; thereby, it may be preferred that the any outer shell 20 (FIG. 1) be removed prior to installing any of the sensor modules 30, 34. The first module connection interface 26 is different from the second module connection interface 28, such that the sensor modules 30, 34 are unable to connect to the wrong interfaces 28, 26.

In addition to the module connection interfaces 26, 28, which are configured to mechanically connect to, and structurally support and carry the sensor modules 30, 34, the chassis 18 also comprises, for each module connection interface 30, 34, a respective electrical connection interface, configured as a respective connector socket 36, 38, for electrically connecting the respective sensor module 30, 34 to the controller (not illustrated in FIG. 3). More precisely, a first connector socket 36 is configured to electrically connect to the first sensor module 30, and a second connector socket 38 is configured to connect to the second sensor module 34. The connector sockets 36, 38 of the chassis 18 are arranged on the top face of the chassis 18, and are geometrically separated from the respective module connection interfaces 30, 34. Each of the first and second sensor modules 30, 34 comprises a respective flexible cable 40, 42 provided with a respective electric connector 44, 46, such that the first sensor module 30 is provided with a first electric connector 44, and the second sensor module 34 is provided with a second electric connector 46. The first electric connector 44 of the first sensor module 30 is configured to be connected to the first connector socket 36, and the second electric connector 46 of the second sensor module 34 is configured to be connected to the second connector socket 38.

Figure 4:
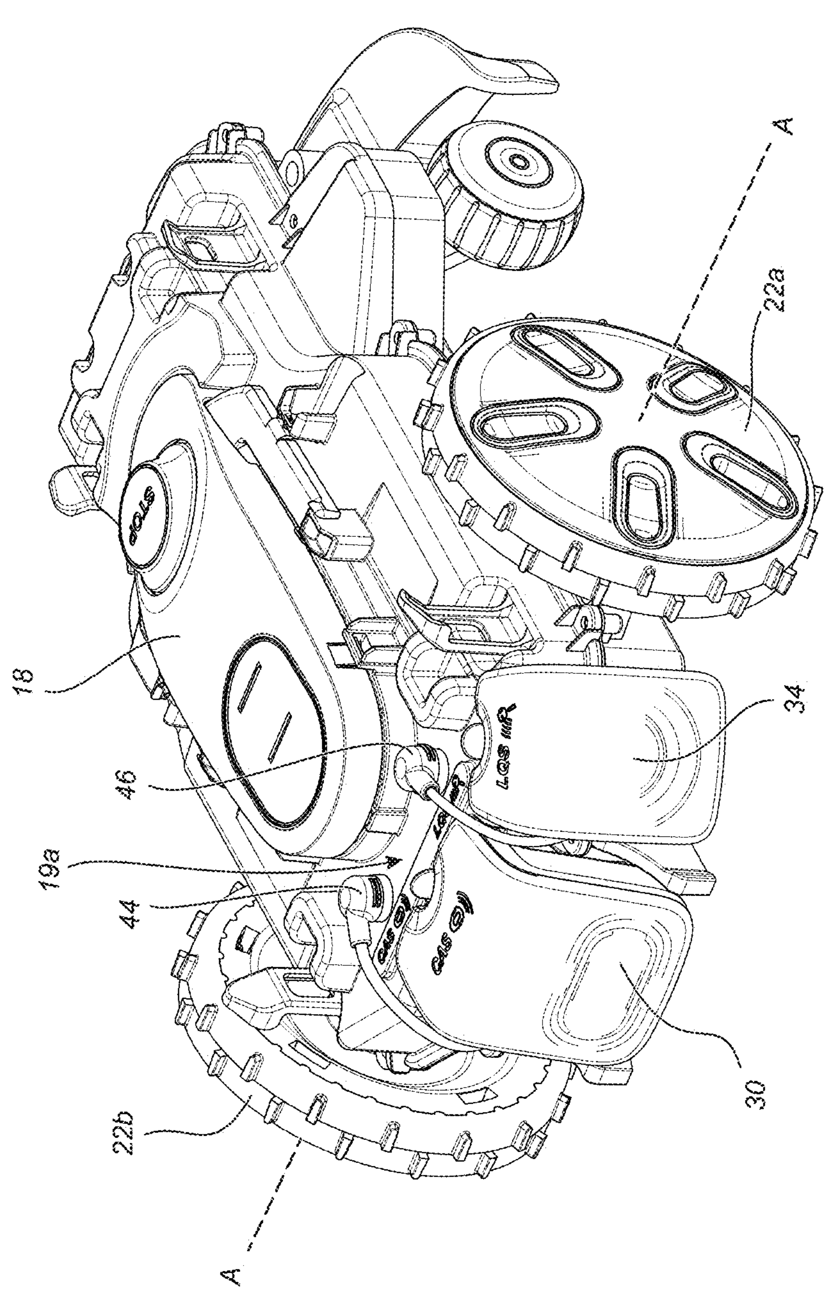
FIG. 4 is a perspective view of the chassis, radar module and lawn quality sensor module of FIG. 3 after connecting the sensor modules to the chassis.

FIG. 4 illustrates the chassis 18 with the first and second sensor modules 30, 34 mechanically connected to their respective module connection interfaces 26, 28 on the chassis 18, and with the electric connectors 44, 46 connected to their respective connector sockets 36, 38 on the chassis 18. When the sensor modules 30, 34 are connected to their respective module connection interfaces, each of the respective sensor modules 30, 34 is held in a respective predetermined geometric relationship with the chassis 18. The centre of mass of the robotic lawnmower 14 is positioned rearward of the wheel axis A of the drive wheels 22*a*, 22*b*, and by virtue of the sensor modules' 30, 34 position forward of the wheel axis A, i.e. on the side opposite of the centre of mass, the added weight of the sensor modules 30, 34 contribute to the traction of the drive wheels 22*a*, 22*b*. The first sensor module 30 has a weight of about 350 grams and the second sensor module 34 has a weight of about 250 grams.

Figure 5:
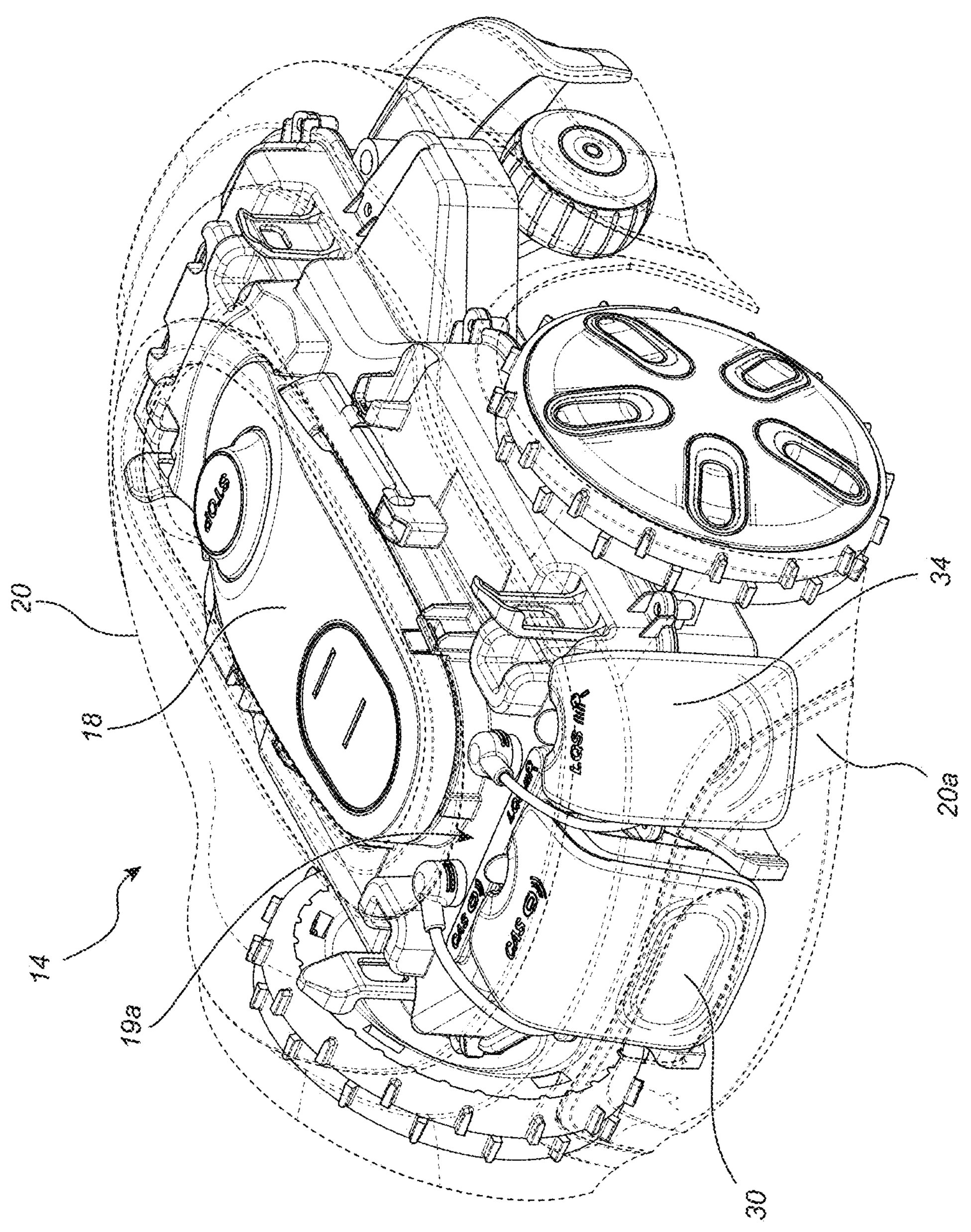
FIG. 5 is a perspective view of the chassis, radar module and lawn quality sensor module of FIG. 4 positioned within an outer shell of the lawnmower of FIG. 2.

While FIG. 4 illustrates the chassis 18 with the outer shell 20 (FIG. 1) removed, the sensor modules 30, 34 and the outer shell 20 are shaped in such a manner that the sensor modules 30, 34 fit between the chassis 18 and the outer shell 20. FIG. 5 illustrates the robotic lawnmower 14 with the outer shell 20 put back in place. The outer shell 20 is illustrated fully transparent, with only the contours of the outer shell 20 schematically illustrated in broken lines, such that the position of the sensor modules 30, 34 is clearly visible.

Figure 6:
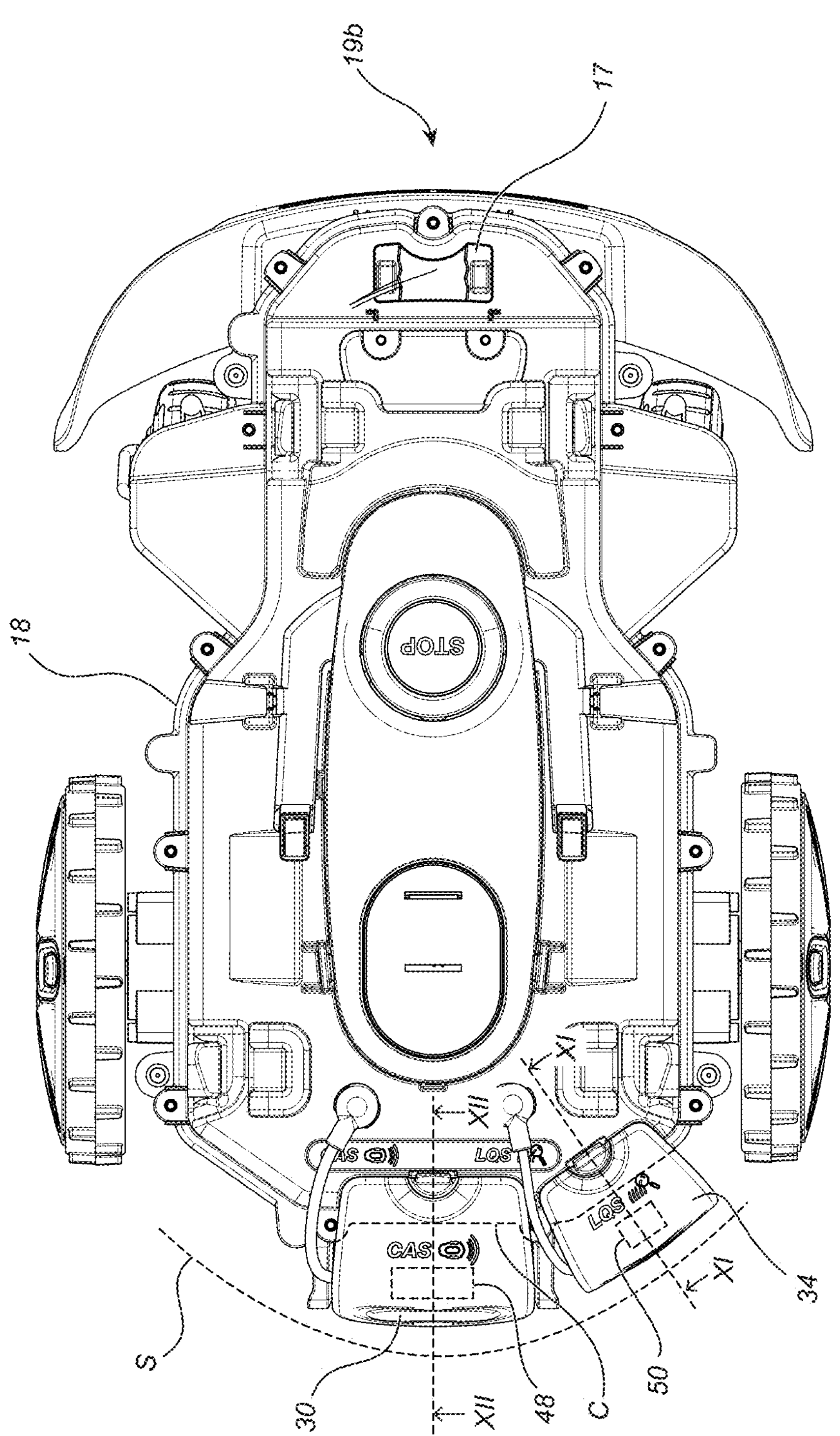
FIG. 6 is a plan view of the chassis, radar module and lawn quality sensor module of FIG. 4 as seen from above.

FIG. 6 illustrates the chassis 18 straight from above. As mentioned hereinabove, the first sensor module 30 comprises a first sensor embodied by a radar 48, and the second sensor module 34 comprises a second sensor embodied by lawn quality sensor 50. As seen straight from above, the sensor modules 30, 34 hold their respective sensors 48, 50 outside the vertical projection of the chassis 18, as illustrated by the broken-line contour C of the chassis. Thereby, the downward-detecting second sensor module 34 may have a free detection path vertically downwards, while still allowing the sensor module to be attached to the chassis 18 from above. At the same time, the sensor modules 30, 34 hold their respective sensors 48, 50 within the vertical projection of the outer shell 20 (FIG. 5), and more precisely, inside the skirt 20*a* (FIG. 5) of the outer shell 20, the inner contour S of which is also illustrated by a broken line. A battery charging interface 17 at the rear end 19*b* of the chassis is configured to connect to a mating battery charging interface of the charging station 16 (FIG. 1); the battery charging interface 17 is accessible via an opening in the rear end of the outer shell 20 (FIG. 1). Due to the position of the charging interface 17 at the rear end 14*b* (FIG. 2) of the robotic lawnmower 14, the robotic lawnmower 14 reverses into the charging station 16 (FIG. 1).

Figures 7, 8:
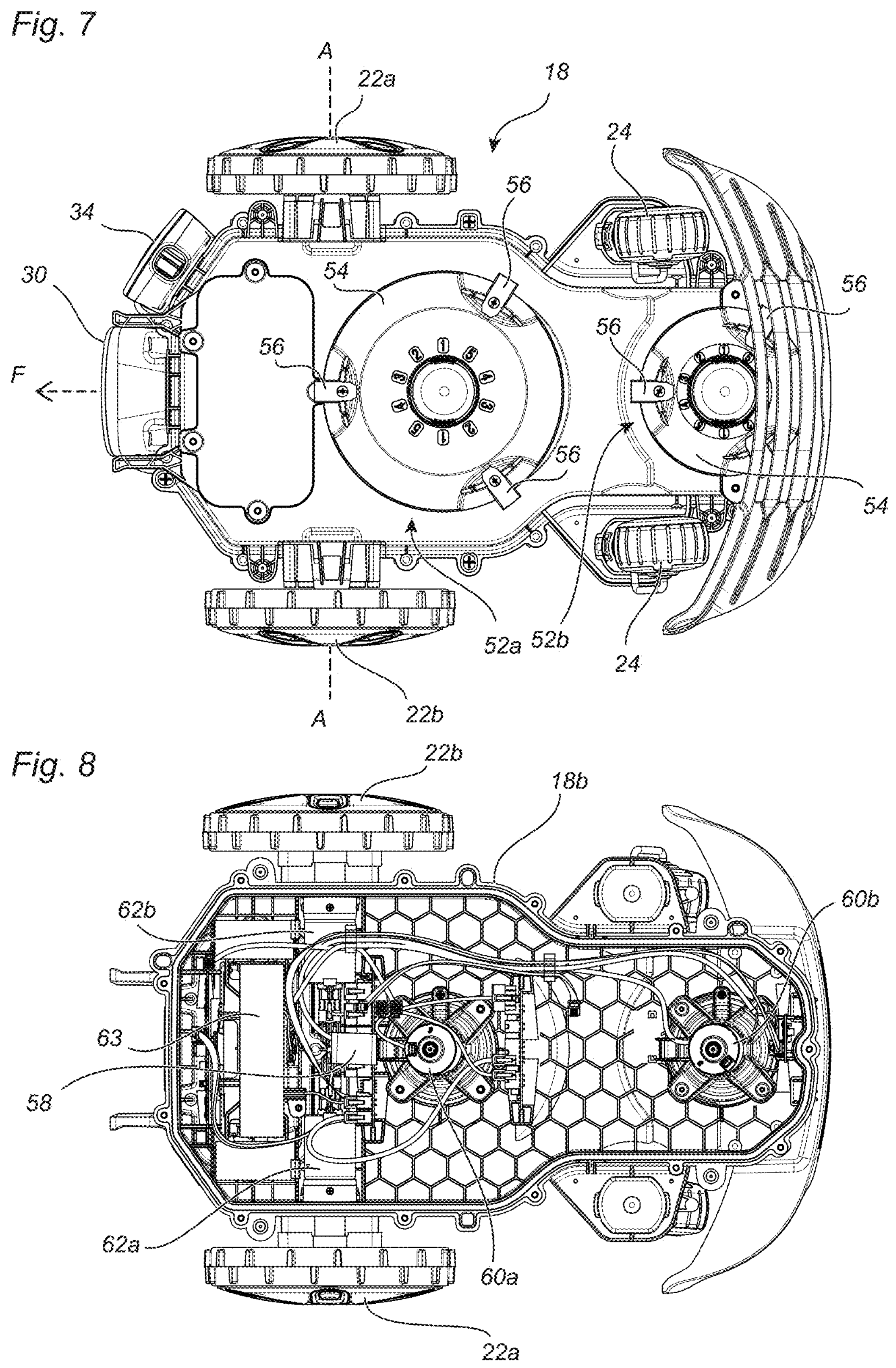
FIG. 7 is a plan view of the chassis, radar module and lawn quality sensor module of FIG. 4 as seen from below.
FIG. 8 is a plan view of the chassis of FIG. 3 as seen from above, with an upper chassis shell removed to expose the interior of the chassis.

FIG. 7 illustrates the chassis 18 of the robotic lawnmower 14 (FIG. 2) from below. The bottom view illustrates, inter alia, the pair of drive wheels 22*a*, 22*b* and the pair of non-driven wheels 24. The drive wheel axis A, about which the drive wheels 22*a*, 22*b* are configured to be driven, is perpendicular to the forward direction F of the robotic lawnmower 14, and the robotic lawnmower 14 is configured to change its heading by rotating the drive wheels 22*a*, 22*b* at different speeds and/or in different directions. The bottom face of the chassis 18 also comprises a set of grass cutters comprising a main grass cutter 52*a* and an auxiliary, rear, grass cutter 52*b*. Each of the grass cutters 52*a*, 52*b* comprises a respective rotary knife carrier disc 54, each knife carrier disc 54 carrying at its perimeter a plurality of grass cutting knives 56 which are pivotally connected to the respective knife carrier discs 54. Each grass cutter 52*a*, 52*b* is configured to rotate the respective set of grass cutting knives 56 in a substantially horizontal cutting plane to cut grass.

FIG. 8 illustrates the interior of the chassis 18 (FIG. 3) with the upper chassis shell 18*a* (FIG. 3) removed, to expose the inside face of the lower chassis shell 18*b*, and various functional elements enclosed within the chassis 18. A controller 58 controls the operation of the robotic lawnmower 14 (FIG. 2). A main cutter motor 60*a* is configured to, responsive to control signals from the controller 58, rotate the main grass cutter 52*a* (FIG. 7), and an auxiliary cutter motor 60*b* is configured to, responsive to other control signals from the controller 58, rotate the auxiliary grass cutter 52*b* (FIG. 7) independently of the main grass cutter 52*a*. The drive wheels 22*a*, 22*b* are configured to be independently controlled by respective wheel motors 62*a*, 62*b*, which wheel motors 62*a*, 62*b* are operated responsive to respective control signals from the controller 58. The controller 58, cutter motors 60*a*, 60*b* and wheel motors 62*a*, 62*b* are powered by a rechargeable battery 63 inside the chassis 18; the battery 63 is charged via the battery charging interface 17 (FIG. 6).

Figure 9:
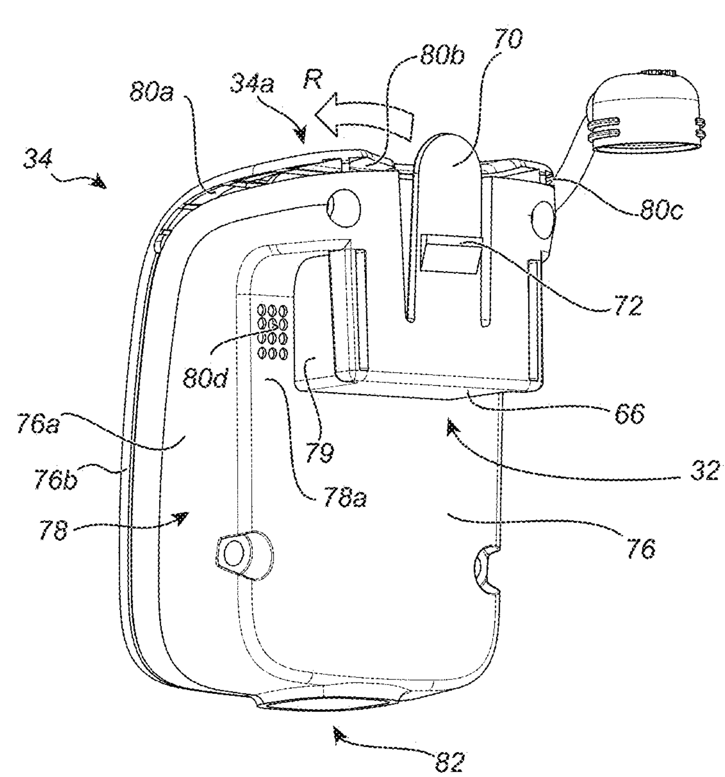
FIG. 9 is a perspective view of the lawn quality sensor module of FIG. 3.
Figure 10:
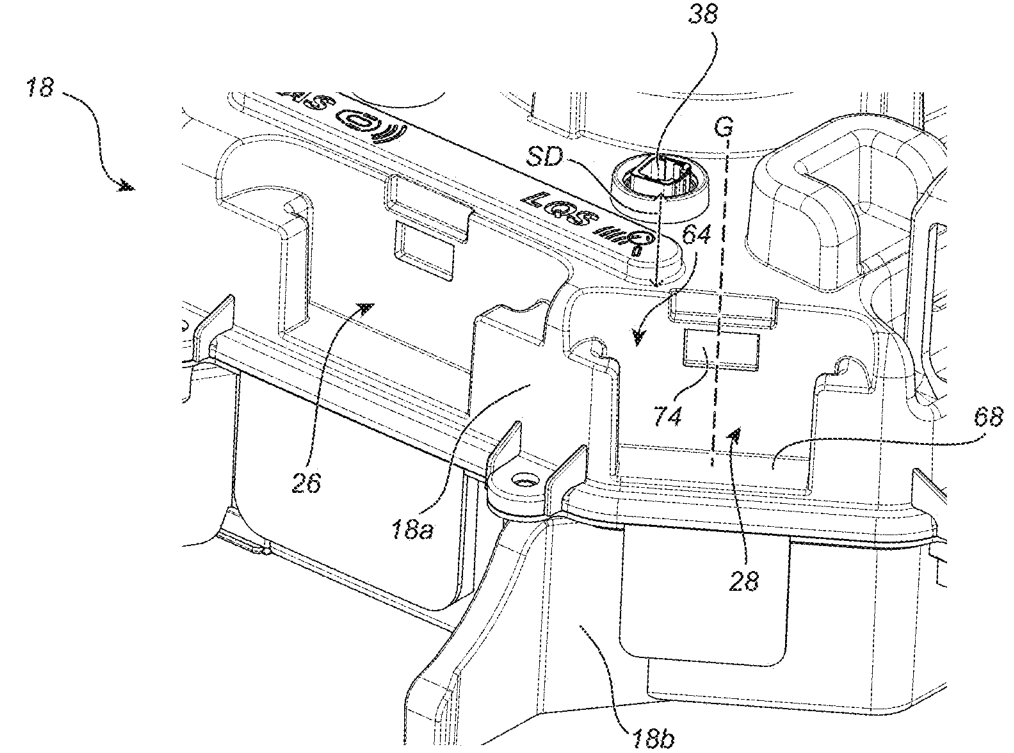
FIG. 10 is a magnified view of a portion of FIG. 3, illustrating module connection interfaces of the chassis.

The perspective of FIG. 9 illustrates the chassis connection interface 32 of the second sensor module 34, and FIG. 10 illustrates the corresponding second module connection interface 28 of the chassis 18. It will be appreciated that the chassis connection interface 32 of the first sensor module 30 (FIG. 3) and the corresponding first module connection interface 26 may be similar. Starting with the view of FIG. 10, the second module connection interface 28 comprises a guide slot 64 configured to receive the chassis connection interface 32 (FIG. 9) of the second sensor module 34 (FIG. 9) from above, along a substantially vertical guide, illustrated by a axis G. The guide slot 64 has, as seen from above, the general shape of a "T". As illustrated in FIG. 9, the chassis connection interface 32 comprises a male key 66 shaped, as seen from below, as a "T" and configured to formfittingly mate with the T-shaped guide slot 64 in a so-called T-slot joint. Referring again to FIG. 10, the guide slot 64 gradually tapers slightly in the downwards direction, such that the key 66 (FIG. 9), when slid downwards into the guide slot 64, will reach a vertical stop position where there is a tight and rattle-free engagement between the guide slot 64 and the key 66. Alternatively, a bottom wall 68 of the guide slot 64 may define a vertical stop position for the key 66.

With reference to FIG. 9, the chassis connection interface 32 comprises a spring tab 70 provided with a barb 72, and the module connection interface 28 (FIG. 10) comprises a recess 74 configured to, once the key 66 has been slid into position within the guide slot 64, receive the barb 72. The bias of the spring tab 70 makes the barb 72 resiliently snap into engagement with the recess 74 when the key 66 is moved along the guide slot 64 to a connected position. By pressing the spring tab 70 in a release direction R perpendicular to the guide axis G, the barb 72 may be released from the recess 74, such that the chassis connection interface 32 of the second sensor module 34 may be removed from the second module connection interface 28.

The second sensor module 34 comprises a sensor module housing 76 which encloses the sensor 50 (FIG. 6). The shape of the sensor module housing 76 defines a main housing body 78, in which the sensor 50 is positioned, and a cantilever member 79 extending in a horizontal direction from the main housing body 78 and comprising the chassis connection interface 32. The sensor module housing 76 is made of plastic, and the chassis connection interface 32, including the key 66 as well as the spring tab 70, is integrally formed with the sensor module housing 76.

The sensor module housing comprises a first housing shell **76*a* and a second housing shell 76*b*, which are attached to each other. A first elongate gap 80*a* between first and second housing shells 76*a*, 76*b* extends along a top edge adjacent to the top face 34*a* of the second sensor module 34, and faces in a first direction. A second elongate gap 80*b* between first and second housing shells 76*a*, 76*b* extends along a top edge of the second sensor module 34 opposite to the first elongate gap 80*a*, faces in a second direction substantially opposite to the first direction. A third elongate gap 80*c* between first and second housing shells 76*a*, 76*b* extends between the first and second elongate gaps, and faces in a third direction. Each of the elongate gaps 80*a*, 80*b*, 80*c* defines an elongate slot which operates as an air inlet for allowing air to enter the second sensor module 34. Each of the gaps 80*a*, 80*b*, 80*c* has a respective length of a few centimetres, and a width of about 2 mm. A vertical wall 78*a* of the main housing body 78 is also provided with an air inlet 80*d* which, when the second sensor module 34 is attached to the chassis 18, faces the chassis 18. The function of the air inlets 80*a*, 80*b*, 80*c*, 80*d* will be described further below with reference to FIG. 11. A sensing aperture 82** operates as an air outlet.

Continuing with FIG. 10, the guide slot 64 is defined by the shape of the upper chassis shell **18*a*. As such, the second module connection interface 28 is integrally formed with the chassis 18. The joint between the upper and lower chassis shells 18*a*, 18*b* does not extend through the module connection interface 28, such that the chassis 18, at the position of the second module connection interface 28, may be defined by a single continuous, indivisible chassis shell wall free from through-holes and joints. The upper and lower chassis shells are made of plastic, and have a wall thickness of about 1.5 mm. FIG. 10 also illustrates the geometric separation, by a separation distance SD, between the second module connection interface 28 and the second connector socket 38**.

Figure 11:
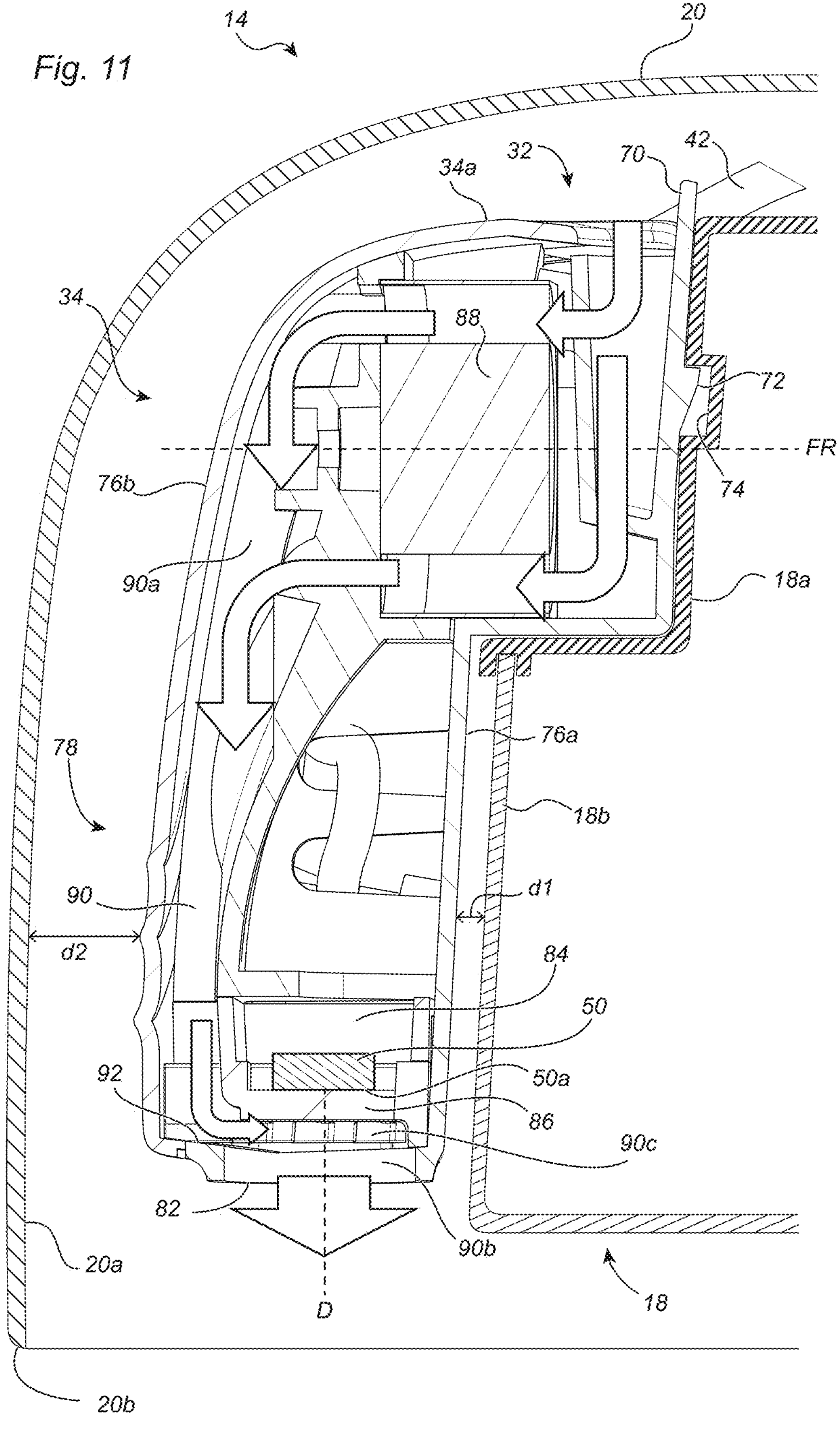
FIG. 11 is a section of the lawn quality sensor module and the chassis of FIG. 4, the section taken along the line XI-XI of FIG. 6.

FIG. 11 illustrates a section of the second sensor module 34 and a portion of the chassis 18 and outer shell 20, the section taken along the line XI-XI illustrated in FIG. 6. As apparent from the view of FIG. 11, the main housing body 78 of the second sensor module 34 extends downwards, outside the vertical projection of the chassis 18, to a position vertically lower than the module connection interface 32, and also holds the lawn quality sensor 50 vertically lower than the module connection interface 32. The cantilever member 79 (FIG. 9) holds a lower portion of the main housing body 78 freely suspended, with a horizontal gap d between the main housing body 78 and the chassis 18 of the order a few mm. The freely suspended portion of the main housing body 78 represents about 60% of the total vertical height of the second sensor module 34.

The outer shell 20 may be movably connected to the chassis 18, and the controller may be configured to detect collisions of the robotic lawnmower 14 by detecting a movement of the skirt **20*a* in relation to the chassis 18. In order to permit the skirt 20*a* to move in relation to the chassis 18, the second sensor module 34 is held with a gap d2 to the skirt 20*a*; the gap d2 may, for example, be of the order a few centimetres. The lower edge 20*b* of the skirt 20*a* is positioned vertically lower than the sensor module. Moreover, the outer shell 20 is shaped to cover also the upper face 34*a* of the sensor module 34**.

While the sensor module housing 76 is provided with various apertures **80*a*, 80*b*, 80*c*, 80*d*, 82, the second sensor module 34 nevertheless also comprises a liquid-tight electronics compartment 84, in which the lawn quality sensor 50 is arranged. The electronics compartment 84 may comprise an empty volume, or may alternatively be potted. A transparent window 86 is arranged at the bottom of the electronics compartment 84, facing the sensing aperture 82 of the sensor module housing 76, and enables light to enter and exit the electronics compartment 84. The lawn quality sensor 50 has a detection face 50*a* which faces in a downwards detection direction along a vertical detection axis D, which is perpendicular to the detection face 50*a* of the sensor 50. The sensor 50 is configured to determine a spectral characteristic of the grass. For the purpose, the lawn quality sensor 50 is configured to detect electromagnetic radiation intensities at two different wavelength ranges, and determine a ratio based on the two intensities. The two wavelength ranges comprise a near-infrared wavelength range and a red wavelength range in the visible wavelength region. As such, the sensor 50 is of the type generally referred to as an NDVI, Normalized Difference Vegetation Index, sensor. The sensor 50 further comprises light-emitting diodes emitting electromagnetic radiation at the two wavelength ranges. The emitted electromagnetic radiation is pulsed, and detection is synchronized with the pulses to discriminate background noise. Electromagnetic radiation is transmitted and received via the sensing aperture 82 along a transmission path which coincides with the detection axis D. The sensor 50 is positioned about 10 mm from the sensing aperture 82**.

The interior of the second sensor module 34 is cooled by an airflow therethrough, which also keeps the transparent window 86 free from dirt. A fan 88 moves air along an air guide 90 from the air inlets **80*a*, 80*b*, 80*c*, 80*d* to the sensing aperture 82, which operates as an air outlet. The fan 88 rotates about a rotation axis FR, which is perpendicular to the detection axis D. Even though the fan 88 is illustrated as an axial fan, a radial fan may enable a more compact arrangement of the fain 88 in the air guide 90. The fan 88 is powered, via the electric cable 42, by the battery 63 (FIG. 8) inside the chassis 18. The air guide 90 comprises an upstream guide segment 90*a* positioned, with regard to the detection direction defined by the detection axis D, at an axial position behind the detection face 50*a*, and a downstream guide segment 90*b* positioned, with regard to the detection direction defined by the detection axis D, at an axial position in front of the detection face 50*a*. The air guide 90 also comprises a flow deflector 92 configured to deflect the flow of air from the upstream guide segment 90*a* towards a space 90*c* in front of the sensor 50, in a deflection direction substantially parallel to the detection surface 50*a*, i.e. perpendicular to the detection axis D. The flow deflector curves the air flow around the detection face 50, such that the air flow brushes the outer surface of the transparent window 86, thereby removing fog and preventing dirt from reaching the transparent window 86 via the sensing aperture 82. The upstream guide segment 90***a* is several times longer than the downstream guide segment 90*b*, such that any sticky dirt particles entering the air guide 90 will get stuck prior to reaching the transparent window 86. Even though not immediately derivable in the section of FIG. 11, the sensing aperture 82 defines an air outlet having an outlet area, perpendicular to the flow direction of the air flow, which is smaller than the cross-section of the air guide upstream of the sensing aperture 82. This results in an overpressure in at least the parts of the of the air guide 90 adjacent to the sensing aperture 82, which prevents entry of dirt from below. Even though not immediately derivable from the section of FIG. 11, the upstream guide section passes the sensor 50 only on a single side of the sensor 50, and more precisely, on the side facing away from the chassis 18. This arrangement positions the sensor 50 as far away from the skirt 20*a* as possible within the module housing 76, such that the lower edge 20*b* of the skirt 20*a* will not limit the sensor's 50 field of view.

Figure 12:
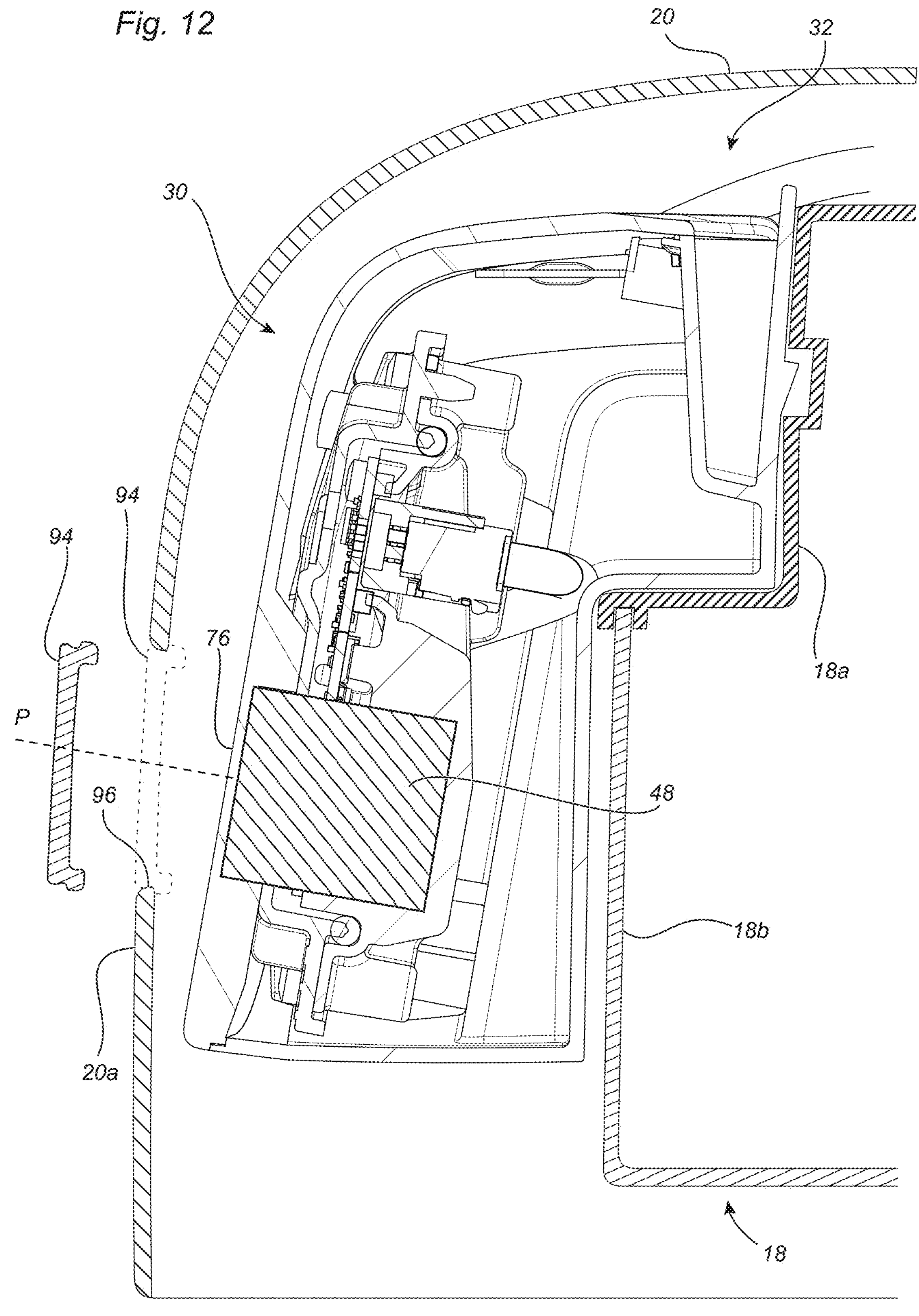
FIG. 12 is a section of the radar module and the chassis of FIG. 4, the section taken along the line XII-XII of FIG. 6.

FIG. 12 illustrates a section of the first sensor module 30 and a portion of the chassis 18 and outer shell 20, the section taken along the line XII-XII illustrated in FIG. 6. With the exception of the lack of an air guide in the first sensor module 30, the overall geometry of the sensor module housing 76 of the first sensor module 30 is similar to that of the second sensor module 34, and the description thereof will not be repeated. Similar to the second sensor module 34, the first sensor module 30, which is a radar module, is positioned between the chassis 18 and the skirt 20*a*. The first sensor module 30 is, similar to the second sensor module 34, powered by the battery 63 (FIG. 8) inside the chassis 18. By arranging the radar in a sensor module 30 outside the chassis 18, the sensor module 30 having its own sensor module housing 76, the radar module housing 76 may, in front of the radar 48, be made of a material and thickness optimized for radar transmissivity, without having to compromise with any design considerations of the material or wall thickness of the chassis 18.

When connecting the first sensor module 30 to the chassis 18, a removable lid 94 is also removed from the skirt 20*a* to expose a skirt aperture 96. The removable lid 94 is snap-fit in the skirt aperture 96, to enable attachment and detachment without tools. The skirt aperture 96 is in register with the first sensor module 30 in such a manner that the transmission path P of the radar 48 within the first sensor module 30 passes through the skirt aperture 96.

Figures 13A, 13B:
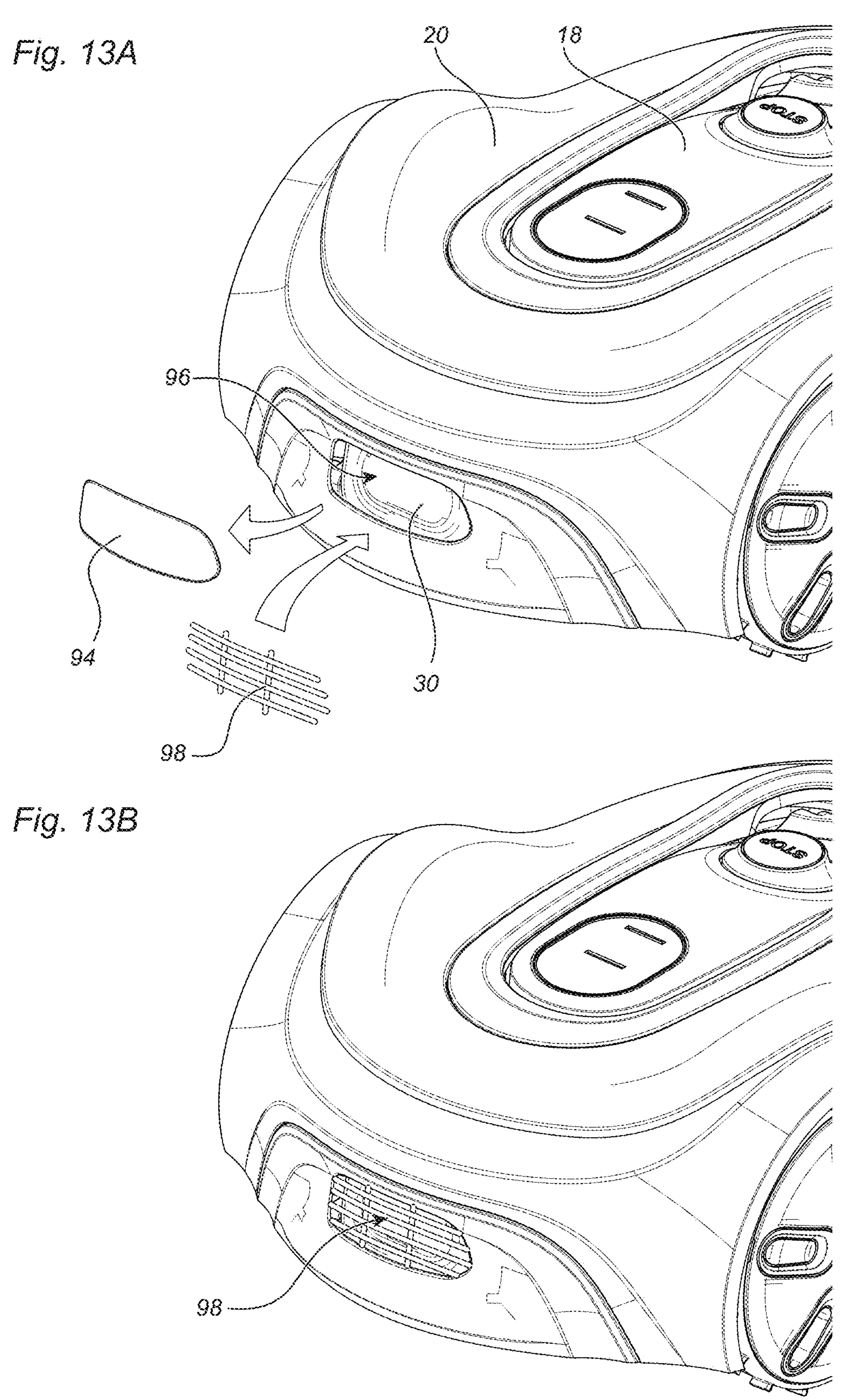
FIG. 13A is a perspective view of a front portion of the robotic lawnmower of FIG. 2, illustrating the removal of a lid from an aperture in a skirt of the robotic lawnmower, and the installation of a grille in the aperture.
FIG. 13B corresponds to the view of FIG. 13A, illustrating the robotic lawnmower with the grille installed.

With reference to FIG. 13A, in conjunction with installing the radar module 30 on the chassis 18 (not visible in FIG. 13A), the lid 94 is removed from the skirt aperture 96. In its place, a tamper protection 98, configured as a coarsely meshed grille, is installed to arrive at the situation illustrated in FIG. 13B. The grille 98 is snap-fit to the skirt aperture 96. The polarization direction of the radar may be matched to the orientation of the grille mesh pattern for maximum transmissivity.

The invention has mainly been described above with reference to a few embodiments. However, as is readily appreciated by a person skilled in the art, other embodiments than the ones disclosed above are equally possible within the scope of the invention, as defined by the appended patent claims. For example, two examples have been given of the sensing functions (radar and lawn quality sensing) of the sensor modules. It will be appreciated that the teachings herein are applicable also to other types of sensors, such as LIDAR (Light Detection And Ranging), SODAR (Sonic Detection And Ranging), humidity sensors, GNSS navigation sensors, etc. In the claims, the word "comprising" does not exclude other elements or steps, and the indefinite article "a" or "an" does not exclude a plurality.

The invention claimed is:

1. A robotic lawnmower system comprising:

a robotic lawnmower comprising a chassis provided with a set of wheels and at least one propulsion motor for propelling the robotic lawnmower via the set of wheels, the chassis enclosing the propulsion motor and a controller configured to control the operation of the at least one propulsion motor; and an outer shell defining an exterior face of the robotic lawnmower, the outer shell comprising a skirt at least partly enclosing the chassis at a distance from the chassis, wherein the robotic lawnmower system further comprises:

a sensor module comprising a sensor and a sensor module housing enclosing the sensor, wherein the sensor module comprises a chassis connection interface for mechanically connecting the sensor module to a module connection interface on an outer face of the chassis, thereby enabling the sensor module to be carried by the robotic lawnmower, wherein, when the sensor module is connected to the chassis, the sensor module holds the sensor outside a vertical projection of the chassis, between the chassis and the skirt.

2. The robotic lawnmower system of claim 1, wherein the module connection interface is located on a top face of the chassis, and the sensor module housing extends downwards to a position vertically lower than the module connection interface.

3. The robotic lawnmower system of claim 1, wherein the sensor module housing comprises a main housing body enclosing the sensor, and a cantilever member comprising the chassis connection interface, wherein, when the sensor module is connected to the chassis, the cantilever member holds the main housing body with a horizontal gap between the main housing body and the chassis.

4. The robotic lawnmower system according to claim 1, wherein the set of wheels comprises a pair of drive wheels arranged on opposing lateral sides of the chassis adjacent to a first longitudinal end of the chassis, wherein the module connection interface is arranged at said first longitudinal end of the chassis, or wherein the module connection interface is integrally formed with the chassis.

5. The robotic lawnmower system according to claim 1, wherein the chassis, at the position of the module connection interface, is defined by a single continuous, indivisible chassis shell wall free from through-holes and joints, or wherein the sensor comprises a radar.

6. The robotic lawnmower system according to claim 1, wherein the module connection interface is located on a top face of the chassis, and the sensor module comprises a downward-detecting sensor, or wherein the module connection interface of the chassis comprises a guide configured to receive the chassis connection interface of the sensor module from above, and wherein the guide comprises a guide slot, and the chassis connection interface comprises a key configured to formfittingly mate with the guide slot.

7. The robotic lawnmower system according to claim 6, wherein one of the module connection interface and the chassis connection interface comprises a resilient snap element configured to, when the chassis connection interface is moved along the guide to a connected position, resiliently snap into engagement with the other of the module connection interface and the chassis connection interface.

8. The robotic lawnmower system according to claim 1, wherein the chassis comprises an electrical connection interface, for electrically connecting the sensor module to the controller, wherein the electrical connection interface is separated from the module connection interface of the chassis.

9. A robotic lawnmower system comprising:

a robotic lawnmower comprising a chassis provided with a set of wheels and at least one propulsion motor for propelling the robotic lawnmower via the set of wheels, the chassis enclosing the propulsion motor and a controller configured to control the operation of the at least one propulsion motor; and an outer shell defining an exterior face of the robotic lawnmower, the outer shell at least partly enclosing the chassis at a distance from the chassis, wherein the robotic lawnmower system further comprises:

a sensor module comprising a sensor and a sensor module housing enclosing the sensor, wherein the sensor module comprises a chassis connection interface for mechanically connecting the sensor module to a module connection interface on an outer face of the chassis, inside the outer shell, thereby enabling the sensor module to be carried by the robotic lawnmower, wherein the sensor is configured to transmit and/or receive electromagnetic radiation along a transmission path, the sensor module housing comprises an air outlet and a first air inlet, and the sensor module comprises a fan configured to move air along an air guide from said first air inlet to the air outlet, wherein one of the air outlet and said first air inlet defines a sensing aperture positioned along the transmission path.

10. The robotic lawnmower system according to claim 9, wherein the sensor module housing comprises a liquid-tight electronics compartment, wherein the sensor is arranged in the electronics compartment, and the electronics compartment comprises a transparent window between the sensor and the air guide.

11. The robotic lawnmower system according to claim 9, wherein said first air inlet is positioned on a substantially vertical wall of the sensor module housing, or wherein said first air inlet is positioned vertically higher than the air outlet when the sensor module is connected to the chassis, or wherein said first air inlet is configured as an elongate slot having a width of less than 4 mm, and a length of more than 20 mm.

12. The robotic lawnmower system according to claim 9, wherein the sensor module housing comprises a first housing shell attached to a second housing shell, wherein said first air inlet is defined by an elongate gap extending along an interface between the first and second housing shells, or wherein the sensor module housing comprises a second air inlet and the first and second air inlets face in different directions.

13. The robotic lawnmower system according to claim 9, wherein said first air inlet is provided in a portion of the sensor module housing which, when the sensor module is connected to the chassis, faces the chassis.

14. The robotic lawnmower system according to claim 9, wherein a detection face of the sensor faces in a detection direction along a detection axis, wherein the air guide comprises an upstream guide segment positioned, with regard to the detection axis, at an axial position behind the detection face, a downstream guide segment positioned, with regard to the detection axis, at an axial position in front of the detection face, and a flow deflector configured to deflect a flow of air from the upstream guide segment towards a space in front of the sensor, in a deflection direction forming an angle of more than 45 degrees with the detection axis.

15. The robotic lawnmower system according to claim 14, wherein the upstream guide section passes the sensor on only one lateral side of the sensor.

16. The robotic lawnmower system according to claim 9, wherein the air outlet has an outlet area of less than 90% of a cross-section of the air guide upstream of the air outlet, or wherein a rotation axis of the fan is transversal to the detection axis, or wherein the transmission path forms an angle of less than 20 degrees with a vertical axis.

17. The robotic lawnmower system according to claim 9, wherein the sensor is be positioned more than 6 mm from the sensing aperture, or wherein the sensor is configured to detect electromagnetic radiation intensities at two different wavelength ranges, and determine a ratio based on the two intensities.

18. A robotic lawnmower comprising:

a chassis provided with a set of wheels and at least one propulsion motor for propelling the robotic lawnmower via the set of wheels, the chassis enclosing the propulsion motor and a controller configured to control the operation of the at least one propulsion motor; and an outer shell defining an exterior face of the robotic lawnmower, the outer shell comprising a skirt at least partly enclosing the chassis at a distance from the chassis, and a radar module positioned between the chassis and the skirt, wherein the skirt comprises a skirt aperture in register with the radar module, and a sensor module comprising a sensor and a sensor module housing enclosing the sensor, wherein the sensor module comprises a chassis connection interface for mechanically connecting the sensor module to a module connection interface on an outer face of the chassis, thereby enabling the sensor module to be carried by the robotic lawnmower, wherein, when the sensor module is connected to the chassis, the sensor module holds the sensor outside a vertical projection of the chassis, between the chassis and the skirt, wherein the module connection interface is located on a top face of the chassis, and the sensor module housing extends downwards to a position vertically lower than the module connection interface.

19. The robotic lawnmower according to claim 18, wherein the skirt aperture is covered by a tamper protection.

20. The robotic lawnmower according to claim 18, wherein the radar module comprises a radar module housing separate from the chassis.

* * * * *